US012657479B2

(12) United States Patent
Cuan et al.

(10) Patent No.: US 12,657,479 B2
(45) Date of Patent: Jun. 16, 2026

(54) COMPUTER-BASED SYSTEMS CONFIGURED FOR UTILIZING MACHINE-LEARNING ENRICHMENT OF ACTIVITY DATA RECORDS AND METHODS OF USE THEREOF

(71) Applicant: Capital One Services, LLC, McLean, VA (US)

(72) Inventors: Lukiih Cuan, Washington, DC (US); Lin Ni Lisa Cheng, New York, NY (US); Michelle S. Olenoski, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 1174 days.

(21) Appl. No.: 17/528,813

(22) Filed: Nov. 17, 2021

(65) Prior Publication Data

US 2023/0153639 A1      May 18, 2023

(51) Int. Cl.
| | |
|---|---|
| *G06N 5/04* | (2023.01) |
| *G06N 5/022* | (2023.01) |
| *G06Q 30/0201* | (2023.01) |

(52) U.S. Cl.
CPC ............... *G06N 5/022* (2013.01); *G06N 5/04* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 7,428,505 B1 | 9/2008 | Levy et al. | |
| 8,775,284 B1 * | 7/2014 | Crook .................... | G06Q 40/00 |
| | | | 705/40 |
| 12,045,840 B2 * | 7/2024 | Pati .......................... | G06N 7/01 |
| 2006/0149674 A1 * | 7/2006 | Cook .................... | G06Q 40/02 |
| | | | 705/44 |
| 2010/0191634 A1 * | 7/2010 | Macy ...................... | G06N 3/08 |
| | | | 705/35 |
| 2013/0036037 A1 | 2/2013 | Meredith et al. | |

(Continued)

OTHER PUBLICATIONS

International Search Report and Written Opinion from International Appln. No. PCT/US22/80036 dated Feb. 8, 2023.

*Primary Examiner* — William J Jacob
(74) *Attorney, Agent, or Firm* — GREENBERG TRAURIG, LLP

(57) ABSTRACT

Systems and methods are disclosed including determining that a first activity data of a completed activity record of a user comprises a predictive characteristic indicative of a potential rejection claim. A computing device produces a request for a second activity data of the completed activity, based at least in part on the first activity data. The computing device receives a plurality of completed activity records related to a plurality of other users and trains an entity-identifying machine learning model to identify a plurality of entity-identifying characteristics related to a plurality of known entities to obtain a trained entity-identifying machine learning model. The computing device applies, when the predictive characteristic is present, the trained entity-identifying machine learning model to identify a known-entity data related to the completed activity of the user. The computing device updates the completed activity record of the completed activity of the user.

22 Claims, 7 Drawing Sheets

(56)                    References Cited

U.S. PATENT DOCUMENTS

| | | | |
|---|---|---|---|
| 2014/0122325 A1 | 5/2014 | Zoldi et al. | |
| 2014/0149128 A1 | 5/2014 | Getchius | |
| 2014/0244453 A1 | 8/2014 | Rephlo | |
| 2014/0278998 A1* | 9/2014 | Systrom | G06Q 30/0277 |
| | | | 705/14.57 |
| 2014/0320487 A1 | 10/2014 | Akenine-Moller et al. | |
| 2015/0339673 A1* | 11/2015 | Adjaoute | G06Q 20/4016 |
| | | | 705/30 |
| 2016/0086029 A1* | 3/2016 | Dubuque | G06V 20/63 |
| | | | 382/159 |
| 2018/0075454 A1 | 3/2018 | Claridge et al. | |
| 2019/0244048 A1* | 8/2019 | Saft | G06V 30/36 |
| 2020/0357051 A1* | 11/2020 | Hunt | G06Q 20/20 |
| 2021/0182830 A1 | 6/2021 | Edwards et al. | |
| 2021/0200852 A1* | 7/2021 | Gupta | G06F 21/33 |
| 2021/0406896 A1* | 12/2021 | Chaturvedi | G06Q 20/405 |
| 2022/0230078 A1* | 7/2022 | Matlick | G06N 5/04 |
| 2023/0050193 A1* | 2/2023 | Pati | G06Q 50/265 |
| 2023/0232052 A1* | 7/2023 | Khavronin | H04N 21/251 |
| | | | 709/219 |
| 2023/0325843 A1* | 10/2023 | Segal | G06Q 20/409 |
| | | | 705/44 |

* cited by examiner

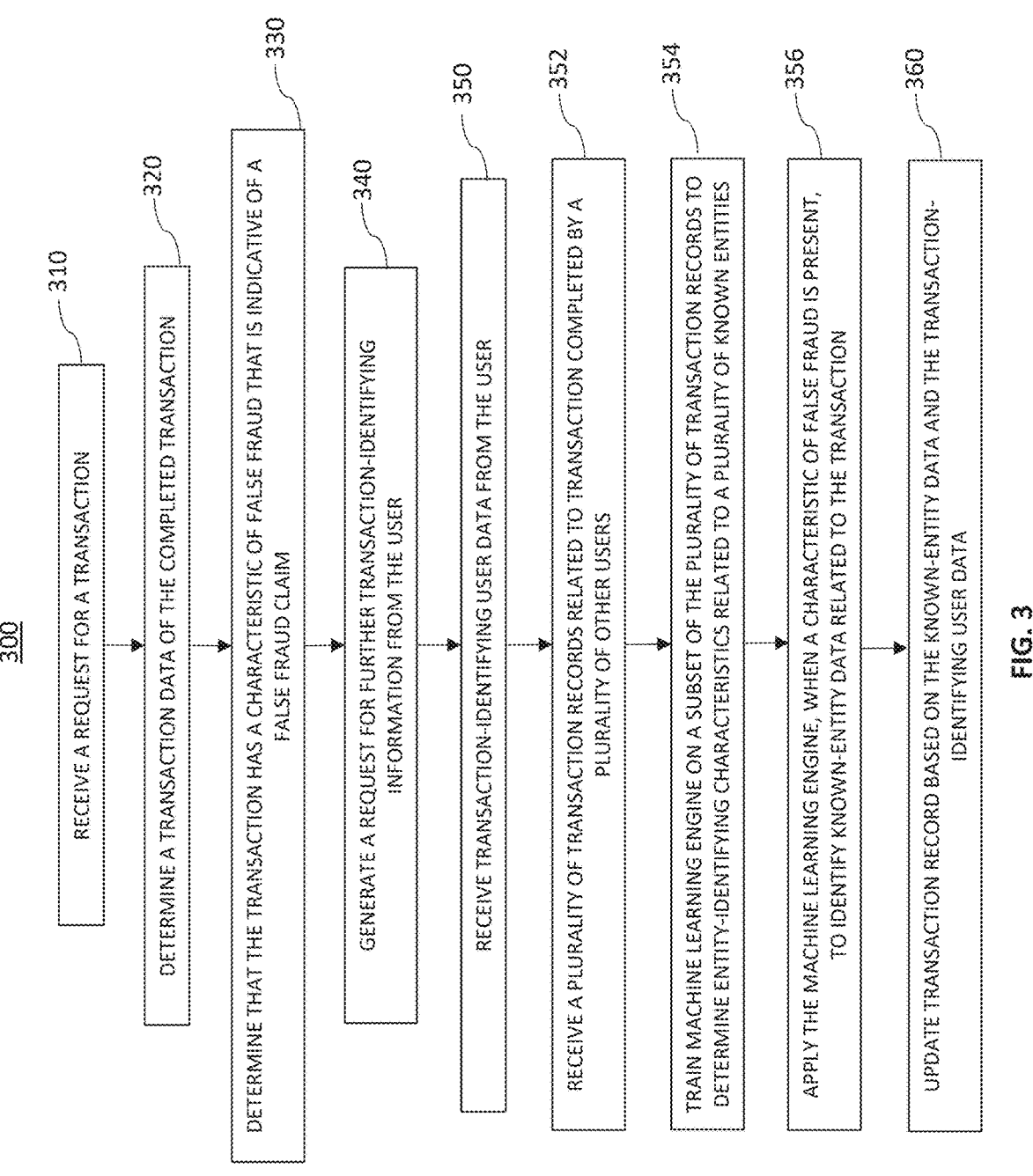

300

310 RECEIVE A REQUEST FOR A TRANSACTION

320 DETERMINE A TRANSACTION DATA OF THE COMPLETED TRANSACTION

330 DETERMINE THAT THE TRANSACTION HAS A CHARACTERISTIC OF FALSE FRAUD THAT IS INDICATIVE OF A FALSE FRAUD CLAIM

340 GENERATE A REQUEST FOR FURTHER TRANSACTION-IDENTIFYING INFORMATION FROM THE USER

350 RECEIVE TRANSACTION-IDENTIFYING USER DATA FROM THE USER

352 RECEIVE A PLURALITY OF TRANSACTION RECORDS RELATED TO TRANSACTION COMPLETED BY A PLURALITY OF OTHER USERS

354 TRAIN MACHINE LEARNING ENGINE ON A SUBSET OF THE PLURALITY OF TRANSACTION RECORDS TO DETERMINE ENTITY-IDENTIFYING CHARACTERISTICS RELATED TO A PLURALITY OF KNOWN ENTITIES

356 APPLY THE MACHINE LEARNING ENGINE, WHEN A CHARACTERISTIC OF FALSE FRAUD IS PRESENT, TO IDENTIFY KNOWN-ENTITY DATA RELATED TO THE TRANSACTION

360 UPDATE TRANSACTION RECORD BASED ON THE KNOWN-ENTITY DATA AND THE TRANSACTION-IDENTIFYING USER DATA

FIG. 3

COMPUTER-BASED SYSTEMS CONFIGURED FOR UTILIZING MACHINE-LEARNING ENRICHMENT OF ACTIVITY DATA RECORDS AND METHODS OF USE THEREOF

COPYRIGHT NOTICE

FIELD OF TECHNOLOGY

The present disclosure generally relates to computer-based systems configured for utilizing machine-learning enrichment of activity data records enriching with user data.

BACKGROUND OF TECHNOLOGY

User activity data records (e.g., transaction records) are typically saved in a database In at least some cases, a user's activity data records that store information of one or limited number of electronic sources may be deficient with regard to allowing the user to recall a performance of a particular activity. If a user's activity data records are not easy to understand, the activity data records may benefit from being enriched from other type of activity-related data based at least in part on modeling of activity-related data that might help other users to recall the performance of particular activities at a later time. In some cases, when users might be unable to recall the performance of a particular activity, user may likely consider the corresponding activity data record to be faulty or faulty recorded.

SUMMARY OF DESCRIBED SUBJECT MATTER

In some embodiments, the present disclosure provides an exemplary technically improved computer-based method that includes at least the following steps of receiving, by a computing device, a completed activity record of a completed activity of a user; determining, by the computing device, a first activity data of the completed activity from the completed activity record; determining, by the computing device, that the first activity data comprises a predictive characteristic indicative of a potential rejection claim, where the predictive characteristic is related to an activity description or an activity position related to the completed activity; producing, by the computing device, a request for a second activity data of the completed activity, based at least in part on the first activity data; instructing, by the computing device, an application executed on a mobile computing device of the user to display, via a graphical user interface element, the request for the second activity data to the user; receiving, by the computing device, the second activity data from the mobile computing device of the user; receiving, by the computing device, a plurality of completed activity records related to a plurality of other users; where the plurality of completed activity records includes: i) a third activity data; and ii) a fourth activity data; training, by the computing device, an entity-identifying machine learning model to identify a plurality of entity identifying characteristics related to a plurality of known entities to obtain a trained entity identifying machine learning model, based at least in part on: i) a first portion of the third activity data; and ii) a second portion of the fourth activity data; applying, by the computing device, when the predictive characteristic is present, the trained entity-identifying machine learning model to identify a known-entity data related to the completed activity of the user, based at least in part on: i) the first activity data; ii) the second activity data; and iii) the plurality of completed activity records related to the plurality of other users; and updating, by the computing device, the completed activity record of the completed activity of the user based at least in part on: i) the second activity data; and ii) the known-entity data.

In some embodiments, the present disclosure provides the exemplary technically improved computer-based methods that further include transmitting, by the computing device, the request for the second activity data to an application executed on a mobile computing device of the user.

In some embodiments, the present disclosure provides the exemplary technically improved computer-based methods that further include where the second activity data comprises at least one of: i) the activity position of the completed activity; ii) at least one visual input associated with the completed activity; iii) a text description of the completed activity; or iv) a categorization of the completed activity.

In some embodiments, the present disclosure provides an exemplary technically improved computer-based system that includes at least the following components of a computing device configured to execute software instructions that cause the computing device to at least: receive a completed activity record of a completed activity of a user; determine a first activity data of the completed activity from the completed activity record; determine that the first activity data comprises a predictive characteristic indicative of a potential rejection claim, where the predictive characteristic is related to an activity description or an activity position related to the completed activity; produce a request for a second activity data of the completed activity, based at least in part on the first activity data; instruct an application executed on a mobile computing device of the user to display, via a graphical user interface element, the request for the second activity data to the user; receive the second activity data from the mobile computing device of the user; receive a plurality of completed activity records related to a plurality of other users; where the plurality of completed activity records includes: i) a third activity data; and ii) a fourth activity data; train an entity-identifying machine learning model to identify a plurality of entity-identifying characteristics related to a plurality of known entities to obtain a trained entity-identifying machine learning model, based at least in part on: i) a first portion of the third activity data; and ii) a second portion of the fourth activity data; apply, when the predictive characteristic is present, the trained entity-identifying machine learning model to identify a known-entity data related to the completed activity of the user, based at least in part on: i) the first activity data; ii) the second activity data; and iii) the plurality of completed activity records related to the plurality of other users; and update the completed activity record of the completed activity of the user based at least in part on: i) the second activity data; and ii) the known entity data.

In some embodiments, the present disclosure provides the exemplary technically improved computer-based systems that further include where the computer device is also configured to transmit the request for the second activity data to an application executed on a mobile computing device of the user.

In some embodiments, the present disclosure provides the exemplary technically improved computer-based systems that further include where the second activity data comprises at least one of: i) the activity position of the completed activity; ii) at least one visual input associated with the completed activity; iii) a text description of the completed activity; or iv) a categorization of the completed activity.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 is a process flow diagram illustrating an example of a computer-based process for enriching an activity data record of a user, according to one or more embodiments of the present disclosure.

DETAILED DESCRIPTION

Figure 1:
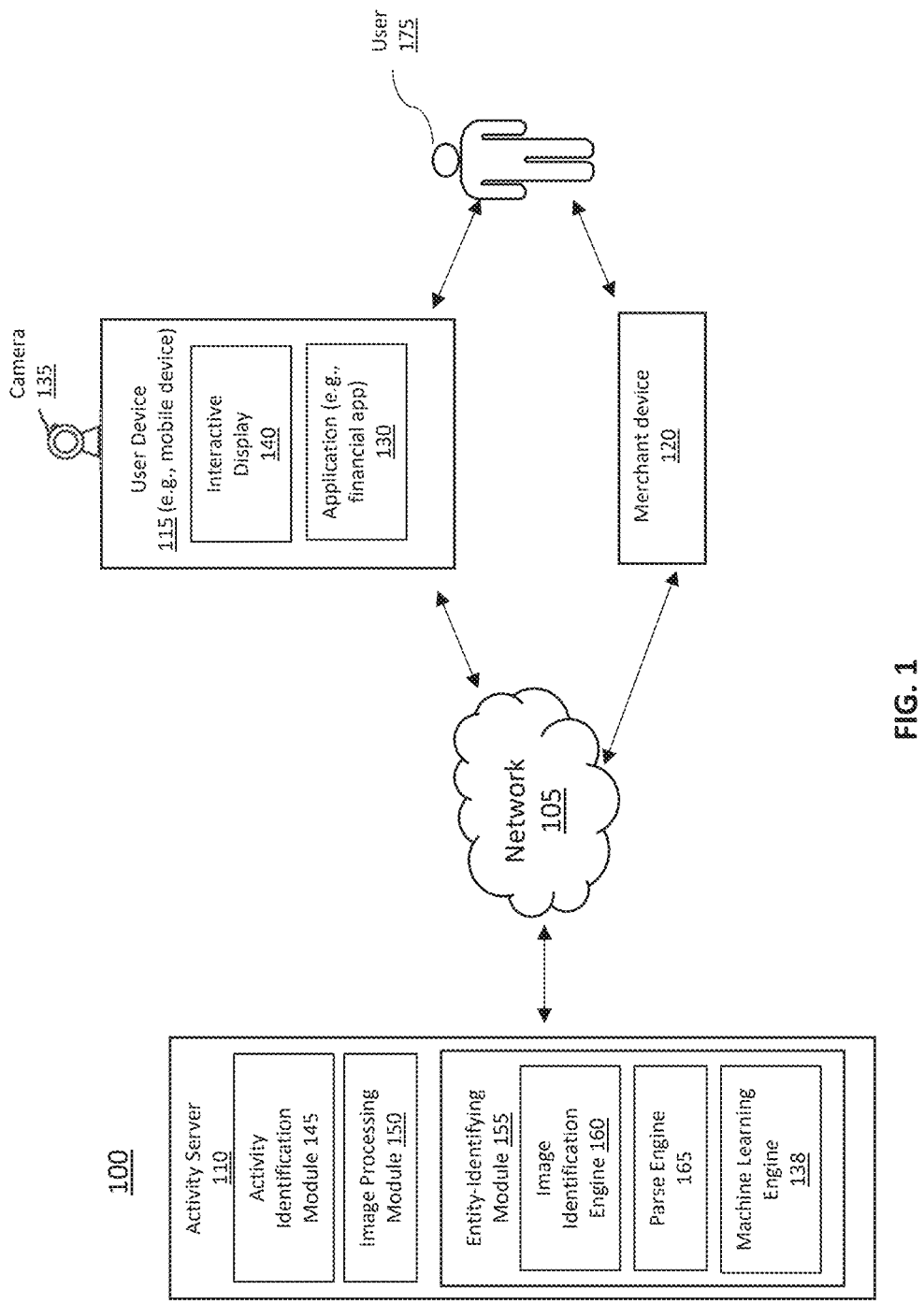
FIG. 1 is a block diagram illustrating an operating computer architecture for enriching an activity data record by adding activity-related user data, according to one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

As used herein, the term "customer" or "user" shall have a meaning of at least one customer or at least one user respectively.

As used herein, the term "mobile computing device" or the like, may refer to any portable electronic device that may include relevant software and hardware. For example, a "mobile computing device" can include, but is not limited to, any electronic computing device that is able to among other things receive and process alerts, credit offers, credit requests, and credit terms from a customer or financial institution including, but not limited to, a mobile phone, smart phone, or any other reasonable mobile electronic device that may or may not be enabled with a software application (App) from the customer's financial institution.

In some embodiments, a "mobile computing device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a customer or financial institution.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

FIGS. 1 through 7 illustrate exemplary computer-based systems and methods of for enriching an activity data record by adding activity-related user data in accordance with at least some embodiments of the present disclosure. The following embodiments provide technical solutions and technical improvements that overcome technical problems, drawbacks and/or deficiencies in at least technical field involving having incomplete data records for accurate identification, by a user, of true fraudulent activities. As explained in more detail below, the present disclosure provides a technically advantageous computer architecture that improves activity data recordkeeping by utilizing machine-learning modeling, based at least in part on activity data records of other users to predict unclear and/or incomplete activity data records and automatically update with additional activity-related data and/or utilize computer-based tools for the user to augment, for example, in real time closer to performance of activity with user-provided data, which can be later viewed by the user, reducing false claims of fraudulent activity ("false fraud"). In some embodiments, the systems and methods are technologically improved by being programmed with machine-learning modeling to identify activity data records that are at high risk for being incorrectly characterized by the user as a fraudulent activity. Some embodiments leverage the wide-spread use of mobile personal communication devices (e.g., smart phones with integrated cameras) to facilitate the inputting of user-generated data to enhance the activity data records. In some embodiments, the systems and methods employ a machine learning model to automatically augment activity data records with known-entity data based on related crowd-sourced transactions from various social networking sources. Based on such technical features, further technical benefits become available to users and operators of these systems and methods. Moreover, various practical applications of the disclosed technology are also described, which provide further practical benefits to users and operators that are also new and useful improvements in the art.

According to some embodiments, there is provided exemplary systems and methods for including data enrichments and/or attachments to completed activity records, which can be later viewed by the user so as to prevent false fraud claims. For example, in some cases, an illustrative system in accordance with the present disclosure may be programmed to identify an activity data record of an activity that may be at high risk for being mis-characterized, by the user, as a fraudulent activity, and sends a user device a request for information corresponding to the activity. The user device may belong to a person associated with an account used for performance of the activity. The user may then provide activity-identifying user data such as, for example, without limitation, a text note, a photograph pertaining to the transaction, a voice memo, etc., which the system stores with the activity data record. In some embodiments, the additional activity-identifying user data may be inputted into an application executing on the user device. In some embodiments, the additional activity-identifying user data may be then viewable by the user, within the activity data record, to help the user recognize the activity at a later date.

FIG. 1 is a block diagram illustration of an exemplary illustrative activity (e.g., transaction) enrichment system 100 used to implement one or more embodiments of the present disclosure. The components and arrangements shown in FIG. 1 are not intended to limit the disclosed embodiments as the components used to implement the disclosed processes and features may vary. In accordance with disclosed embodiments, the activity enrichment system 100 may include including a activity server 110 in communication with a user device 115 and a merchant device 120 via a network 105.

Activity server 110 may be associated with a financial institution. For example, activity server 110 may process financial transactions, or manage individual accounts. One of ordinary skill will recognize that activity server 110 may include one or more logically or physically distinct systems.

In some embodiments, the activity server 110 may include hardware components such as a processor (not shown), which may execute instructions that may reside in local memory and/or transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

Examples of hardware components may include one or more processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

User device 115 may be associated with an individual 175 who is authorized to use a financial account (e.g., an account holder or authorized user). When a transaction is conducted (i.e., a transaction in added to the financial account and transaction record), activity server 110 may prompt the user 175 to provide transaction-identifying details via the user device 115. For example, activity server 110 may trigger a push notification to be displayed on the user device 115. The user 175 may, through the user device 115, provide transaction-identifying information to the activity server 110. As non-limiting examples, the transaction-identifying information may include at least one text description, at least one voice memo, at least one photo image (e.g., captured with a camera of the user device 115), location information, etc.

In some embodiments, the user device 115 is a mobile computing device. The user device 115, or mobile user device, may generally include at least computer-readable non-transient medium, a processing component, an Input/Output (I/O) subsystem and wireless circuitry. These components may be coupled by one or more communication buses or signal lines. The user device 115 may be any portable electronic device, including a handheld computer, a tablet computer, a mobile phone, laptop computer, tablet device, a multi-function device, a portable gaming device, a vehicle display device, or the like, including a combination of two or more of these items.

It should be apparent that the architecture described is only one example of an architecture for the user device 115, and that user device 115 can have more or fewer components than shown, or a different configuration of components. The various components described above can be implemented in hardware, software, or a combination of both hardware and software, including one or more signal processing and/or application specific integrated circuits.

In some embodiments, the wireless circuitry is used to send and receive information over a wireless link or network to one or more other devices' suitable circuitry such as an antenna system, an RF transceiver, one or more amplifiers, a tuner, one or more oscillators, a digital signal processor, a CODEC chipset, memory, etc. The wireless circuitry can use various protocols, e.g., as described herein.

The user device 115 may include an application such as a financial application 130 (or application software) which may include program code (or a set of instructions) that performs various operations (or methods, functions, processes, etc.), as further described herein.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the financial application 130 may enable users to access, view, and/or manage an existing financial account of the user. For example, in some embodiments, financial application 130 may display the user's transaction history with details about each completed transaction in a financial account transaction record. In some embodiments, the financial application 130 may provide push notifications to the user 175, prompting the user 175 to provide additional transaction-identifying information for a transaction that the activity server 110 identifies as at risk for being falsely identified as fraud by the user 175. For instance, the financial application 130 may send a push notification stating that a transaction has been identified as high-risk for a false fraud claim by the user 175 and prompt the user 175 to provide additional transaction-identifying information for the identified transaction. In some embodiments, the financial application 130 may prompt the user 175 to select from a list of categories that best characterizes the type of transaction (i.e., restaurant, travel, etc.).

As shown in FIG. 1, in some embodiments, the user device 115 may be a mobile computing device that includes a camera 135 and an interactive display 140. In some embodiments, the financial application 130 may be an application provided by the financial entity. In one implementation, the financial application 130 may be automatically installed onto the user device 115 after being downloaded. In addition, in some embodiments, the financial application 130 or a component thereof may reside (at least partially) on a remote system (e.g., activity server 110) with the various components (e.g., front-end components of the enrollment app) residing on the user device 115. As further described herein, the financial application 130 and the activity server 110 may perform operations (or methods, functions, processes, etc.) that may require access to one or more peripherals and/or modules. In the example of FIG. 1, the activity server 110 includes a activity identification module 145, an image processing module 150 and an entity-identifying module 155.

In some embodiments, the activity identification module 145 may be implemented as an application (or set of instructions) or software/hardware combination configured to perform operations for identifying transactions that have an elevated risk for being falsely identified by the user 175 as a fraudulent activity. In some embodiments, the activity identification module 145 may utilize data and characteristics of the transaction, such as, but not limited to, a transaction identifier, a merchant name associated with the transaction, a location of the transaction identifier, a location of the transaction, or any combination thereof, to determine if the transaction is at risk for being falsely identified by the user 175 as a fraudulent activity. In some embodiments, the activity identification module 145 may calculate a transaction risk score by comparing the transaction data, and characteristics of the transaction, to data and characteristics of other related transactions, both of the user 175 and of other consumers, which have been falsely claimed as fraudulent. For example, in some instances, the transaction identifier (e.g., name) that may be displayed to the user 175 in the transaction record may be a random collection of characters. In some instances, the transaction may be linked to a merchant or vendor that would be often falsely claimed as fraudulent. In some instances, the transaction may occur at a low frequency location. In other instances, the transaction may be missing data fields commonly associated with valid transactions. In some instances, the location or name associated with the transaction in the transaction record may be different from the name of the merchant provided to the user 175 at the time of the transaction. In each of these instances, among others, the activity identification module 145 may determine that the transaction has a high transaction risk score and the user 175 would be prompted to provide further transaction information.

The image processing module 150 may be implemented as an application (or set of instructions) or software/hardware combination configured to perform operations (or methods, functions, processes, etc.) for receiving and processing visual input (e.g., without limitation, image(s), video(s), etc.), via the network 105, from the camera 135 of the user device 115. In some embodiments, the image(s) may be image(s) of the merchant location, food eaten at a restaurant, merchandise that was purchased during the transaction, etc. The image processing module 150 may process the image, detect the subject of the image using one or more digital image processing techniques, store the image, and detect and store portions of the image containing data relevant to the transaction (i.e., store sign, product purchased, etc.) in the transaction record. In some embodiments, digital image processing techniques include, but are not limited to, optical character recognition and machine learning image recognition. In some embodiments, a neural network model may be used for the machine learning image recognition. In some embodiments, the image processing module 150 may perform digital image processing operations and/or tasks on the image, such as pattern recognition in order to detect one or more portions of the image that may include identifying objects relevant to the transaction. In some embodiments, pattern recognition techniques may include machine learning pattern recognition.

In some embodiments, the activity server 110 may be configured to utilize one or more machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
    i) Define Neural Network architecture/model,
    ii) Transfer the input data to the exemplary neural network model,
    iii) Train the exemplary model incrementally,
    iv) determine the accuracy for a specific number of timesteps,
    v) apply the exemplary trained model to process the newly-received input data,
    vi) optionally and in parallel, continue to train the exemplary trained model with a predetermined periodicity.

In some embodiments, the transaction enrichment system 100 may employ the Artificial Intelligence (AI)/machine learning techniques to determine at least one known entity data, i.e., a category, a location or a merchant name of a transaction based on transaction-identifying user data submitted by the user 175 in previous, related transactions.

In some embodiments, the transaction enrichment system 100 may include an entity-identifying module 155 that may be in communication with transaction database(s) of the financial institution for providing information for identifying characteristics related to entities (i.e., merchant or vendor) associated with transactions. The entity-identifying module 155 may then generate known entity data based on the identifying characteristics of the entities. In some embodiments, the transaction database(s) may include historical transaction data entries. The historical transaction data entries may include data related to past transactions completed by the user 175 and a plurality of other users. In some embodiments the entity-identifying module 155 may leverage the data in the transaction database(s) to determine, for example, a category, location, and/or merchant/vendor name of a transaction. The entity-identifying module 155 may receive data and employ an image identification engine 160, a parse engine 165 and a machine learning engine 170. In some embodiments, each of the image identification engine 160, the parse engine 165 and the machine learning engine 170 may include, e.g., software, hardware and/or a combination thereof. For example, in some embodiments, the image identification engine 160 may include a processor and a memory, the memory having instructions thereof that cause the processor to recognize data of objects and/or subjects in an image. In some embodiments, the parse engine 165 may include a processor and a memory, the memory having instructions thereof that cause the processor to parse the recognized data. In some embodiments, the machine learning engine 170 may include a processor and a memory, the memory having instructions stored thereon that cause the processor to determine, without limitation, at least a category, location, and/or merchant/vendor name from the parse data.

The image identification engine 160 may be implemented as an application (or set of instructions) or software/hardware combination configured to perform operations (or methods, functions, processes, etc.) for processing and recognizing data of, without limitation, one or more objects, subjects, or both, present in an visual input (e.g., image, video file, etc.). In some embodiments, the image identification engine 160 may use one or more computer visual recognition techniques and/or algorithms to recognize at least one data object, subject, or both, or other identifier (e.g., background, weather condition, etc.) present in an image provided by the user 175. Such computer visual recognition techniques used by the image identification engine 160 may use the =output of one or more digital image processing operations performed by the image processing module 150. In some embodiments, the computer visual recognition techniques may include performing at least one computer visual recognition task such as, for example, without limitation, object recognition (e.g., object classification to classify one or more data objects found within the image), object identification to identify individual instances of objects (e.g., identifying one or more data objects present in the image), and/or processing the image data to detect at least one specific condition (e.g., a particular activity engaged into by identified subject(s)). Examples of data objects that may be visible in an image may include, without limitation, merchants' logos, street signs, menus, etc.

In some embodiments, the parse engine 165 may transform the historical transaction data and the real-time transaction data such that the machine learning engine 170 may generate known entity data based on one or more features of the transaction data. Thus, in some embodiments, the parse engine 165 may receive the historical transaction data and the real-time transaction data, parse the data, and extract features according to a feature extraction algorithm. In some embodiments, the feature extraction algorithms may be a mapping process with a relevance score based on components identified from optical character recognition (OCR). In some embodiments, the OCR can be mapped into the components layout to partially extract data. In some embodiments, data parsing and feature extraction may utilize methods depending on a type of data being received. For example, the parse engine 165 may include language parsing when the data includes text and/or character strings. Thus, in some embodiments, the parse engine 165 may include, e.g., a classifier for natural language recognition.

In some embodiments, the features extracted by the parse engine 165 may be employed by the machine learning engine 170 to identify known-entity data such as, for example, a category, location, and/or merchant name related to a user transaction.

In some embodiments, where the user 175 submits a text description of the transaction, the system 100 may employ the entity-identifying module 155 to find common words and/or patterns between the recognized text description and text data provided by the user 175 in previous transactions. Based on the common words and/or patterns found, the entity-identifying module 155 may predict a transaction category (e.g., restaurant, movie theater, store, etc.), and the transaction record may be automatically updated to reflect this categorization. For example, if the user-submitted text for a transaction includes the word "food", and historically, the user 175 would have included the word "food" in text descriptions for restaurants, the transaction and future transactions associated with the entity would be categorized as a restaurant.

In other embodiments, the entity-identifying module 155 may, e.g., employ one or more the AI/machine learning techniques, via the machine learning engine 170, to determine a category, location, and/or merchant name of a transaction based on text data submitted by other users in previous, related transactions. For example, in some embodiments, where the user 175 may submit a text description of the transaction, the entity-identifying module 155 may crowdsource data previously submitted by other users and the machine learning engine 170 may employ machine learning clustering to the crowdsourced data to find common words and/or patterns between the text description and the crowdsourced data. Based on the common words and/or patterns found, the machine learning engine 170 may predict a transaction category (e.g., restaurant, movie theater, store, etc.), and the entity-identifying module 155 may update the transaction record to reflect this categorization. For example, if the user-submitted text for a transaction includes the word "food", and the crowdsourced transactions associated with the same entity by other users would also include the word "food", the transaction, and future transactions associated with the entity may be categorized as a restaurant.

In some embodiments, the entity-identifying module 155 may employ one or more AI/machine learning techniques to predict a category, location, and/or merchant name associated with a transaction based on visual input (e.g., images) submitted by other users in previous, related transactions. For example, in some embodiments, where the user 175 may submit an image associated with the transaction, the entity-identifying module 155 may crowdsource image data previously submitted by other users and the machine learning engine 170 may employ machine learning clustering to find one or more similar patterns across all the images. Based on at least one image pattern found, the machine learning engine 170 may predict a transaction category (e.g., restaurant, movie theater, store, etc.), and the transaction record may be automatically updated, by the entity-identifying module 155, to reflect this categorization. For example, if the user-submitted image for a transaction would include a store sign, and crowdsourced image(s) associated with the same entity and submitted by other users would also include the store sign or logo, the transaction, and future transactions associated with the entity may be automatically updated to include the name depicted on the store sign.

In some embodiments, the exemplary machine learning engine 170 is trained on a portion of the historical transaction data entries and a portion of the real time transaction data entries to more accurately predict entity-identifying characteristics related to known merchants/vendors. Specifically, the exemplary machine learning engine 170 may be trained such that predictions of entity-identifying characteristics may become increasingly accurate as further data entries are provided to the activity server 110. For example, in some embodiments, the machine learning engine 170 may predict that a certain merchant/vendor is a restaurant, based on historical transaction data entries. However, if real-time transactions related to that merchant/vendor continue to be falsely identified as fraud by users, the machine learning engine 170 may be trained on the new data subsets to categorize the merchant/vendor differently. Examples of different merchant categorizations include, but are not limited to: restaurants vs. groceries, movies vs. entertainment, etc.

In some embodiments, merchant device 120 may be, as a non-limiting example, a point-of-sale device. Merchant device 120 may submit transaction authorization to activity server 110, which, when authorized, become posted transactions. Merchant device 120 may also request payment from activity server 110 (e.g., through the automated clearing house (ACH)), which then become posted transactions.

Network 105 may be of any suitable type, including individual connections via the internet such as cellular or Wi-Fi networks. In some embodiments, network 105 may connect participating devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
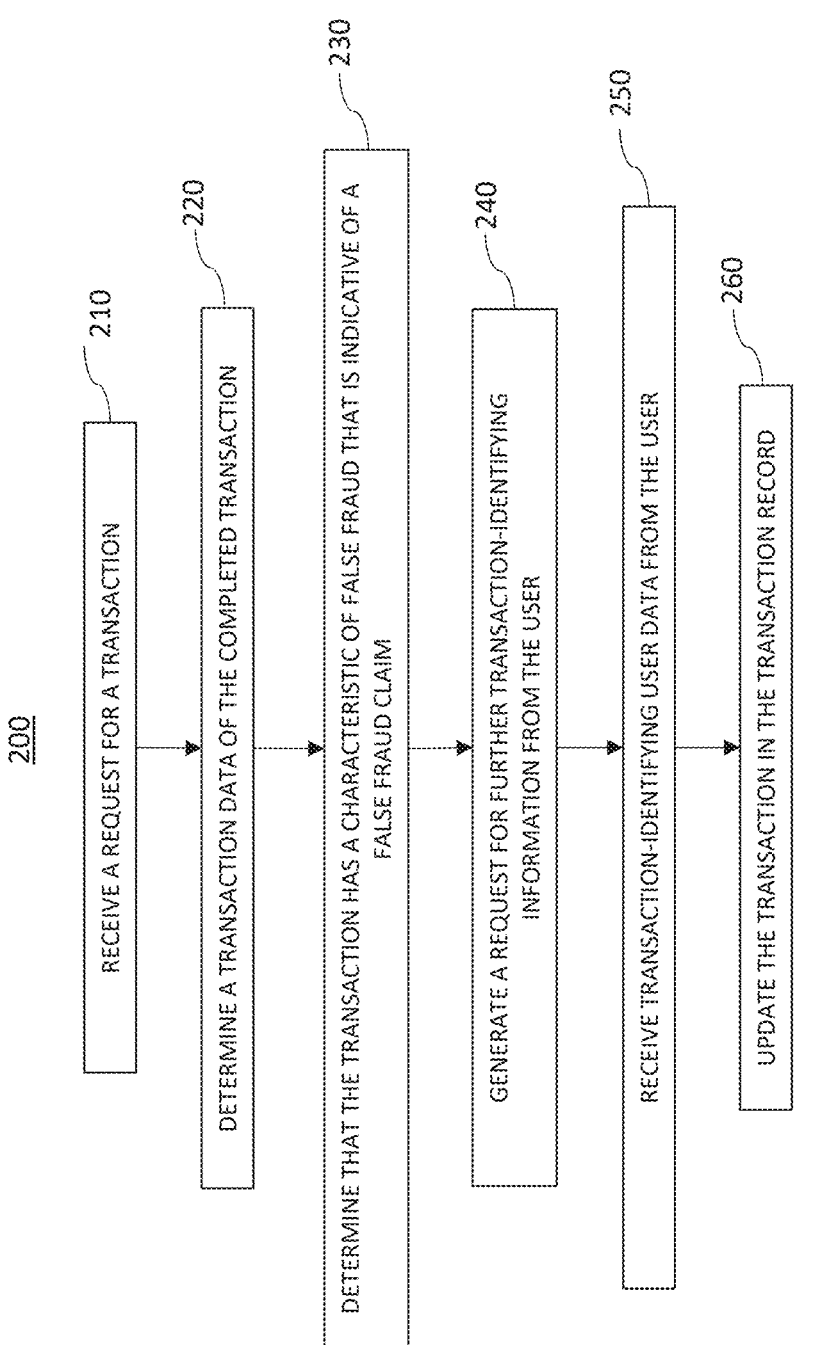
FIG. 2 is a process flow diagram illustrating an example of a computer-based process for enriching an activity data record of a user, according to one or more embodiments of the present disclosure.

FIG. 2 is a process flow diagram illustration of an example of an illustrative computer-mediated process for enriching a transaction record of a user 175 according to one or more embodiments of the present disclosure. The exemplary computer-mediated process 200 may be executed by software, hardware, or a combination thereof. For example, process 200 may be performed by including one or more components described in the transaction enrichment system 100 of FIG. 1 (e.g., activity server 112, user device 115 and merchant device 120).

In 210, the exemplary computer-based system (e.g., the activity server 110) may receive a request for a transaction from a financial account associated with a user 175 (e.g., of user device 115). In some embodiments, the transaction request may include transaction information for a transaction (e.g., pending and posted) associated with a specific financial account.

In 220, the activity server 110 may determine a transaction data of the completed transaction of the user 175 from the completed transaction record. This transaction data may include at least one of: a transaction identifier, a merchant name associated with the transaction, a location of the merchant associated with the transaction, and/or a location of the transaction.

In 230, the activity identification module 145 determines that the transaction has a characteristic of false fraud that would be indicative of a potential false fraud claim, based on the transaction data. In some embodiments, the activity identification module 145 may use the transaction data to calculate a transaction risk score to determine if the transaction is at risk for being falsely identified as fraudulent activity. The transaction risk score may be based on a comparison of the transaction data to data of other related transaction, both of the user 175 and of other consumers, which have been falsely claimed as fraudulent.

In 240, in response to the determination that the transaction has a characteristic indicative of a potential false fraud claim, the activity server 110 may generate a request for further transaction-identifying information from the user 175 and instruct the financial application 130 to prompt the user 175 to input further transaction-identifying information via the user device 115. In some embodiments, the activity server 110 may trigger a push notification to be displayed on the user device 115 via the financial application 130, notifying the user 175 that the transaction is unclear and requesting further information.

For example, if the activity server 110 determines that the transaction may be at risk for being mislabeled as false fraud based on a lack of a merchant information, the push notification may read "We don't recognize the merchant. Please provide further information." In some embodiments, the user 175 may then be prompted to input a text description, a voice memo, or upload a photo/video related to the transaction. In some embodiments, the push notification may request the user 175 select from a list of options in response to a specific question regarding the transaction. For example, the push notification may read: "We don't recognize the merchant. How would you categorize this transaction?", and provide a list of transaction categories including, but not limited to: restaurant, grocery store, movie theater, etc.

In 250, the activity server 110 may receive transaction-identifying user data from the user 175, via the user device 115. In some embodiments, the transaction-identifying user data is a selection, by the user 175, from the list of options provided to the user 175 by the activity server 110, as described above, characterizing the transaction. In some embodiments, the transaction-identifying user data is a text memo. In this embodiment, the user 175 may manually enter the text, which would be automatically via the network 105. In some embodiments, the transaction-identifying user data may be in the form of a voice memo. In such embodiments, the voice memo may be recorded via the financial application 130 available to all users of the user device 115. In other embodiments, the voice memo may be recorded by a voice memo recording application that comes with a mobile phone user device 115, and the resulting voice memo may be uploaded by a browser that comes with the mobile phone to the activity server 110. In such implementations, the phone would not need the transaction application 130 to be installed on it. Instead, the mobile phone user device 115 may just use its native capabilities.

In some embodiments, the transaction-identifying user data may be an image related to the transaction. In some embodiments, the image may be captured by a camera of the user device 115 and transmitted via network 105. In some embodiments, the image capture may be performed by the financial application 130 available to all users of the user device 115. In some embodiments, the image capture may be performed by a camera application that comes with a mobile phone user device 115, and the resulting image may be uploaded via a browser application that may come with the mobile phone to the activity server 110. In such implementations, the phone would not need the transaction application 130 to be installed on it. Instead, the mobile phone user device 115 may just use its native capabilities.

In 260, the transaction record is updated in the user's financial account transaction record to include the transaction-identifying user data. In some embodiments, the transaction-identifying user data may be viewable by the user 175 within the transaction record and the user's financial account transaction record at any time.

FIG. 3 is a process flow diagram illustration an example of an illustrative computer-mediated process 300 for enriching a transaction record of a user 175 according to one or more embodiments of the present disclosure. The exemplary computer-mediated process 300 may be executed by software, hardware or a combination thereof. For example, process 300 may be performed by including one or more components described in the transaction enrichment system 100 of FIG. 1 (e.g., activity server 112, user device 115 and merchant device 120).

In some embodiments, the process 300 may include the steps of as the process 200 and may further include steps in which a machine learning model analysis may be performed to further identify known-entity data related to the user transaction.

At 352, the activity server 110 may receive a plurality of transaction records related to transactions completed by a plurality of other users from transaction database(s). In some embodiments, the plurality of transaction records may include historical transaction data entries and real time transaction data entries from the plurality of other users. In some embodiments the entity-identifying module 155 may leverage the historical transaction data entries and real time transaction data entries to determine, for example, a category, location, and/or merchant/vendor name related to a transaction.

In some embodiments, for example, the parse engine 165 may parse text and character strings from the text memos in the historical transaction data entries, and extract entity-identifying features related to a merchant/vendor. For example, the parse engine 165 may analyze the text memos from the historical transaction data entries to determine that similar characters, words or identifiers are used in relation to a specific merchant/vendor. The machine learning engine 170 may then be employed by the entity-identifying module 155 to predict a category or name of the merchant/vendor, based on these entity-identifying features extracted by the parse engine 165.

In some embodiments, the image identification engine 160 may analyze at least one image from the historical transaction data and extract entity-identifying data objects related to a vendor/merchant. For example, the image identification engine 160 may determine that similar data objects such as, for example, a merchant/vendor logo or sign, a street sign, a type of product (e.g., an image of a food) would be used in relation to a specific merchant/vendor. The machine learning engine 170 may then be employed by the entity-identifying module 155 to predict a category or name of the merchant/vendor, based on these similar data objects identified by the image identification engine 160.

In some embodiments, at 354, the machine learning engine 170 may be trained on a subset of the historical transaction data entries and a subset of the real time transaction data entries so as to determine entity-identifying characteristics related to a plurality of known vendors/merchants to obtain a trained machine learning engine. In some embodiments, thousands of historical transaction data entries and real time transaction data entries, provided by a plurality of other users, may be fed to the machine learning engine 170 from the activity server 110 and the transaction database. The machine learning engine 170 may be trained such that predictions of entity-identifying characteristics become increasingly accurate as further data entries are provided to the activity server 110. For example, in some embodiments, the machine learning engine 170 may predict that a certain merchant/vendor would be a restaurant, based on historical transaction data entries. However, if real-time transactions related to that merchant/vendor continue to be falsely identified as fraud by users, the machine learning engine 170 may be trained on the new data subsets to categorize the merchant/vendor differently.

At 356, when the characteristic indicative of a potential false fraud claim is present, the trained machine learning engine 170 may be applied to identify known-entity data related to the user transaction. In some embodiments, the trained machine learning engine 170 may identify known-entity data based at least in part on the user transaction data, the transaction identifying data input by the user 175, and the plurality of transaction records related to transactions completed by the plurality of other users. Thus, the trained machine learning engine 170 may predict, for example, the category of the merchant/vendor, a location of the merchant/vendor, a name of the merchant/vendor, etc.

At 360, the transaction record may be automatically updated in the user's financial account transaction record based at least in part on the known-identity data predicted by the trained machine learning engine 170 and the transaction-identifying user data. In some embodiments, the transaction-identifying user data may be viewable by the user 175 within the transaction record and the user's financial account transaction record at any time.

Figure 4:
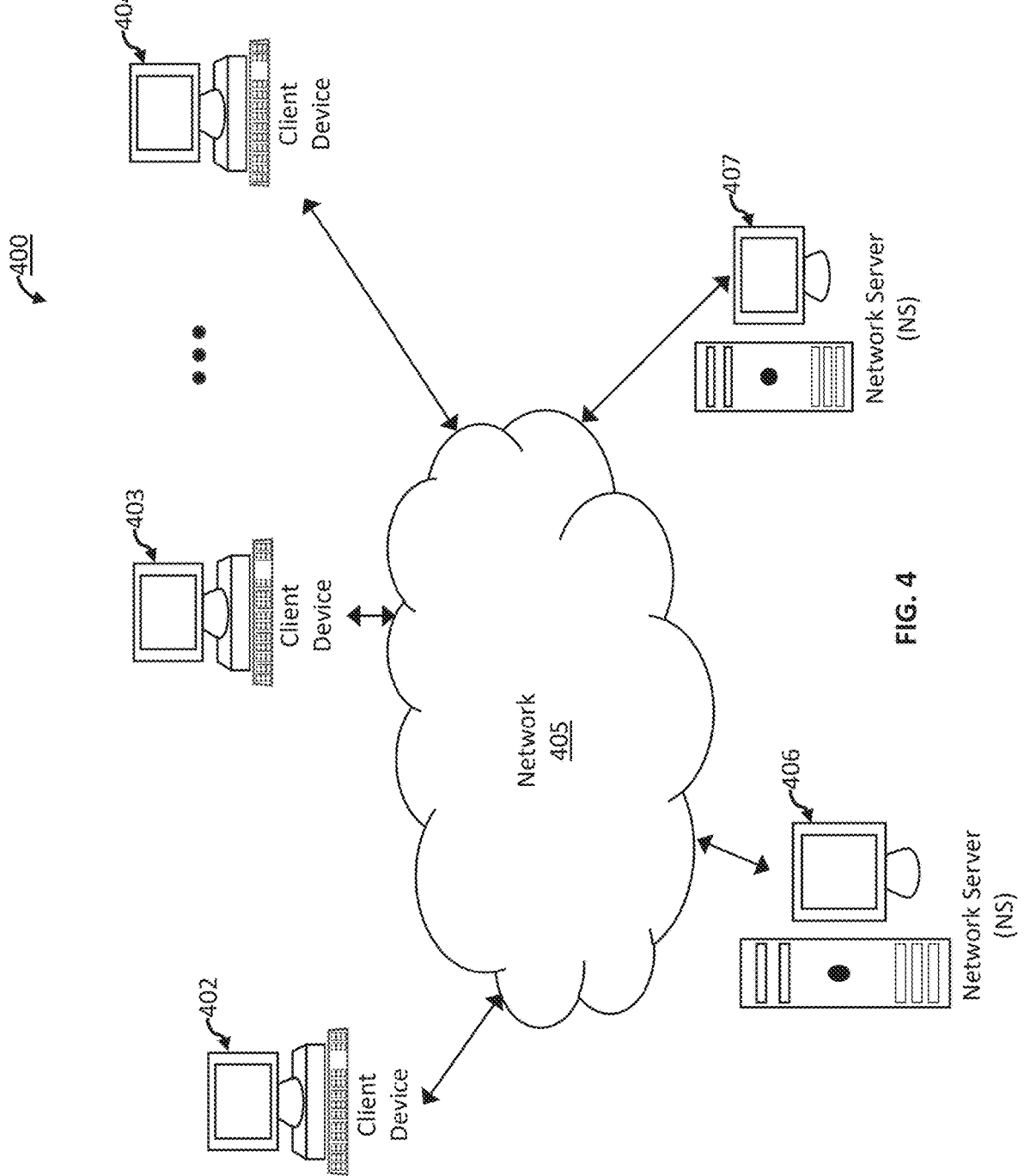
FIGS. 4-7 show one or more schematic flow diagrams, certain computer-based architectures, and/or screenshots of various specialized graphical user interfaces which are illustrative of some exemplary aspects of at least some embodiments of the present disclosure.

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi™, WiMax, CDMA, OFDM, OFDMA, LTE, satellite, ZigBee™, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java™, .Net, QT, C, C++, Python™, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee™, 3G, 4G, 5G, GSM, GPRS, WiFi™, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
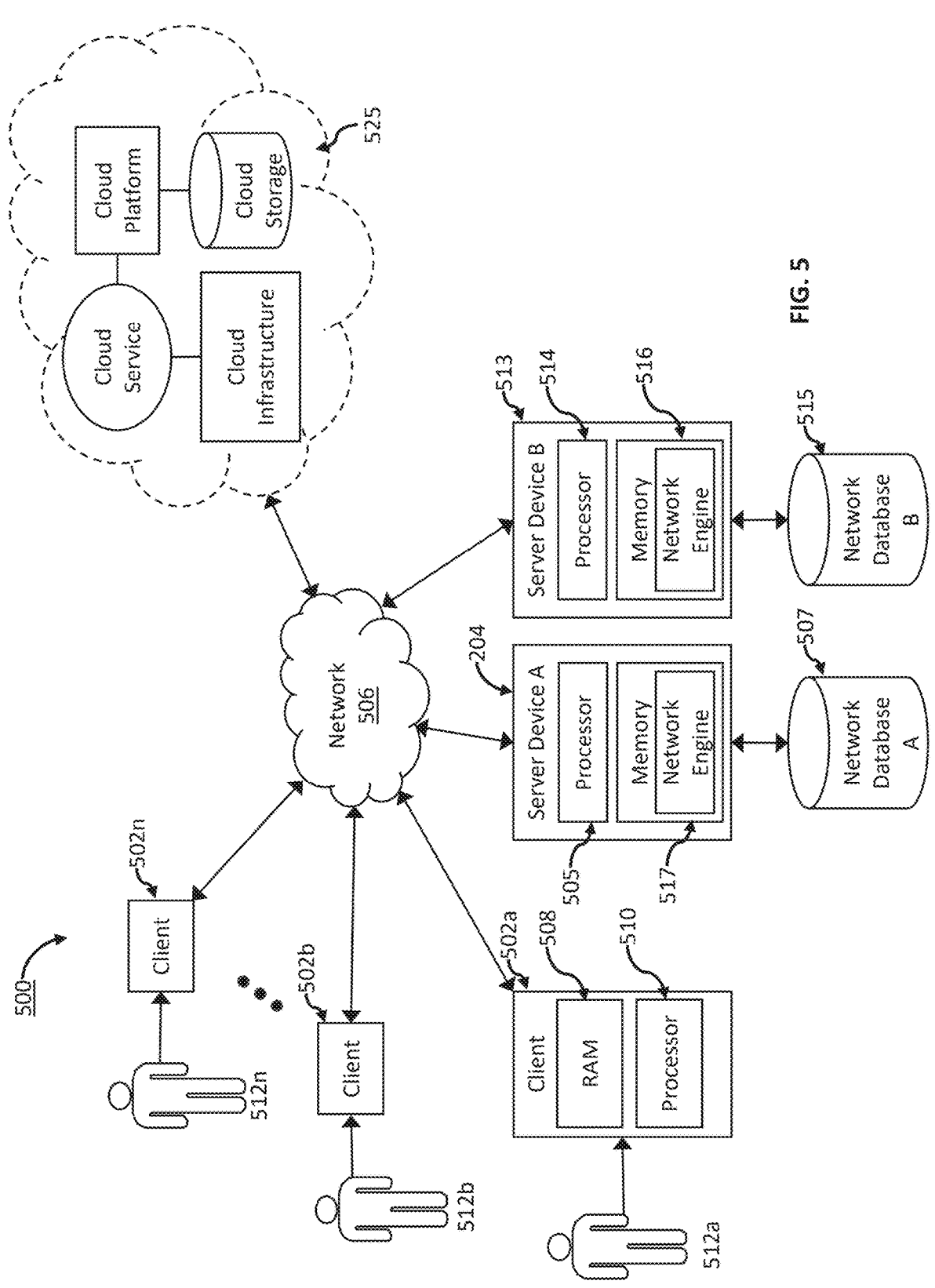

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502*a*, member computing device 502*b* through member computing device 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic™, Java™, Python™, Perl™, JavaScript™, and etc.

In some embodiments, member computing devices 502*a* through 502*n* may also comprise a number of external or internal devices such as a mouse, a CD-ROM, DVD, a physical or virtual keyboard, a display, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™, Windows™, and/or Linux. In some embodiments, member computing devices 502*a* through 502*n* shown may include, for example, personal computers executing a browser application such as Microsoft Corporation's Internet Explorer™, Apple Computer, Inc.'s Safari™, Mozilla Firefox, and/or Opera. In some embodiments, through the member computing client devices 502*a* through 502*n*, user 512*a*, user 512*b* through user 512*n*, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
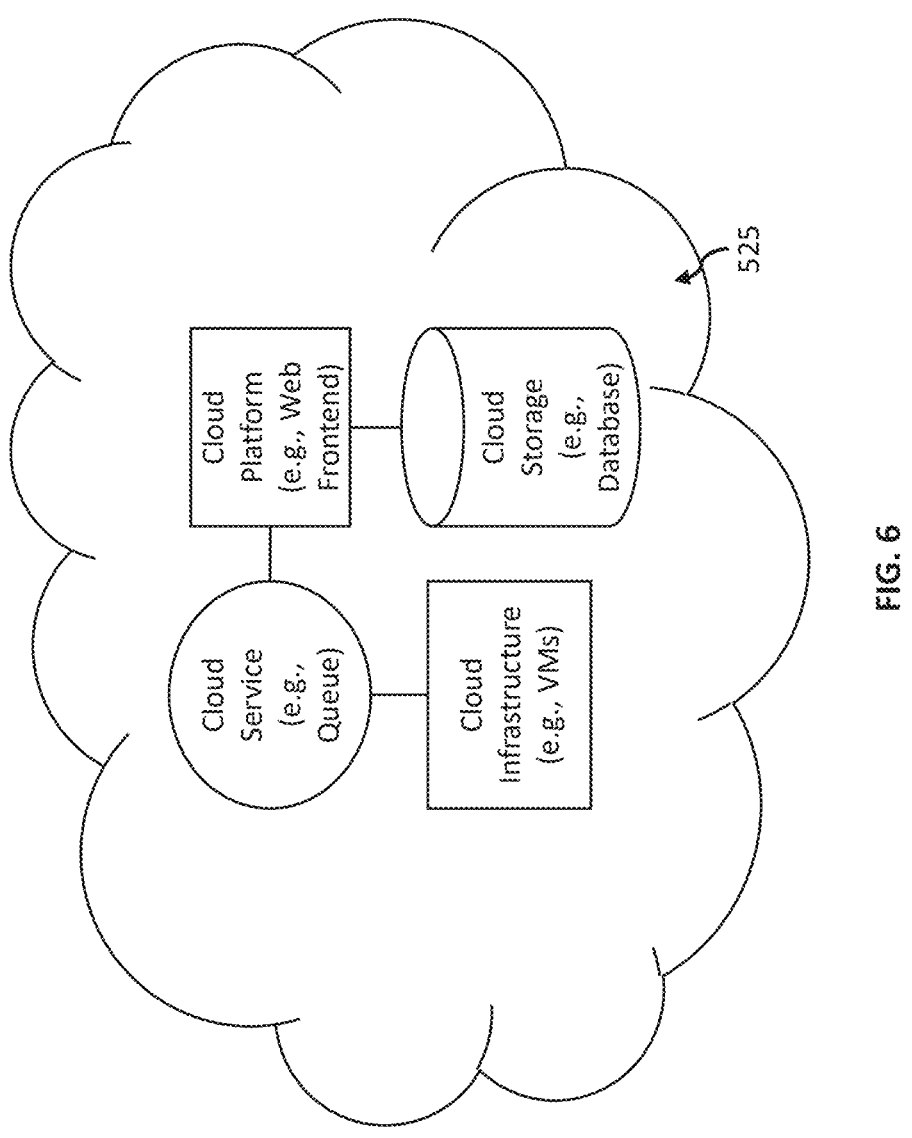
Figure 7:
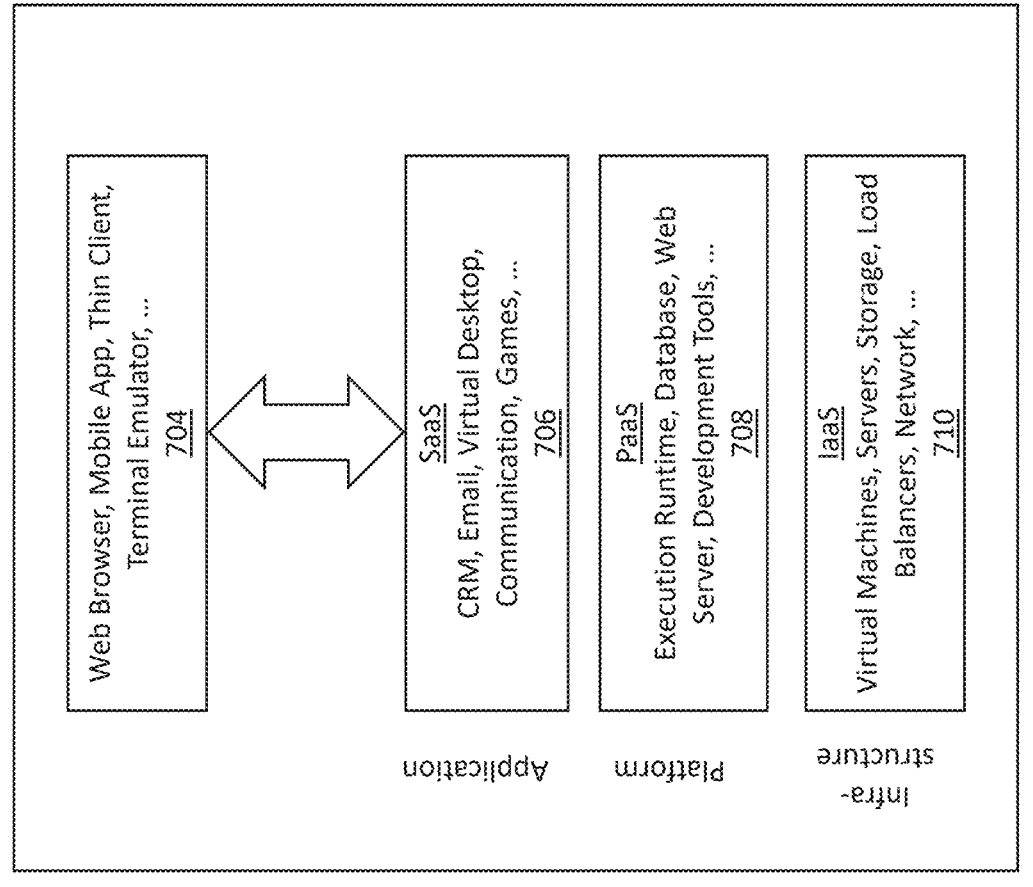

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX™, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi™, WiMax, CDMA, satellite, Zig-Bee™, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift™, Java™, JavaScript™, Python™, Perl™, QT™, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15)

Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24).NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9, 999), at least 10,000 (e.g., but not limited to, 10,000-99, 999), at least 100,000 (e.g., but not limited to, 100,000-999, 999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000, 000 (e.g., but not limited to, 1,000,000,000-999,999,999, 999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the term "transaction" should be understood to refer to any communications between two or more entities and shall be construed to include, but not be limited to, commercial transactions including sale and purchase transactions and the like.

The aforementioned examples are, of course, illustrative and not restrictive.

At least some aspects of the present disclosure will now be described with reference to the following numbered clauses.

1. A method including:

receiving, by a computing device, a completed activity record of a completed activity of a user;

determining, by the computing device, a first activity data of the completed activity from the completed activity record;

determining, by the computing device, that the first activity data includes a predictive characteristic indicative of a potential rejection claim, where the predictive characteristic is related to an activity description or an activity position related to the completed activity;

producing, by the computing device, a request for a second activity data of the completed activity, based at least in part on the first activity data;

instructing, by the computing device, an application executed on a mobile computing device of the user to display, via a graphical user interface element, the request for the second activity data to the user;

receiving, by the computing device, the second activity data from the mobile computing device of the user;

receiving, by the computing device, a plurality of completed activity records related to a plurality of other users;

where the plurality of completed activity records includes:

i) a third activity data; and ii) a fourth activity data;

training, by the computing device, an entity-identifying machine learning model to identify a plurality of entity-identifying characteristics related to a plurality of known entities to obtain a trained entity-identifying machine learning model, based at least in part on:

i) a first portion of the third activity data; and ii) a second portion of the fourth activity data;

applying, by the computing device, when the predictive characteristic is present, the trained entity-identifying machine learning model to identify a known-entity data related to the completed activity of the user, based at least in part on:

i) the first activity data, ii) the second activity data and iii) the plurality of completed activity records related to the plurality of other users; and updating, by the computing device, the completed activity record of the completed activity of the user based at least in part on:

i) the second activity data and ii) the known-entity data.

2. The method of clause 1, where the completed activity of the user is a completed transaction of the user.

3. The method of clause 1, where the activity description includes a name of a merchant or a name of an entity associated with the merchant.

4. The method of clause 1, where the rejection claim is a false fraud claim.

5. The method of clause 1, where the predictive characteristic is a characteristic of false fraud.

6. The method of clause 1, where the third activity data includes historical transaction data entries.

7. The method of clause 1, where the fourth activity data includes real time transaction data entries;

8. The method of clause 1, further including transmitting, by the computing device, the request for the second activity data to an application executed on a mobile computing device of the user.

9. The method of clause 1, where the second activity data includes at least one of:

i) the activity position of the completed activity;

ii) at least one visual input associated with the completed activity;

iii) a text description of the completed activity; or iv) a categorization of the completed activity.

10. The method of clause 1, where the known-entity data includes a name of a merchant.

11. A system including:

a computing device configured to execute software instructions that cause the computing device to at least:

receive a completed activity record of a completed activity of a user;

determine a first activity data of the completed activity from the completed activity record;

determine that the first activity data includes a predictive characteristic indicative of a potential rejection claim, where the predictive characteristic is related to an activity description or an activity position related to the completed activity;

produce a request for a second activity data of the completed activity, based at least in part on the first activity data;

instruct an application executed on a mobile computing device of the user to display, via a graphical user interface element, the request for the second activity data to the user;

receive the second activity data from the mobile computing device of the user;

receive a plurality of completed activity records related to a plurality of other users;

where the plurality of completed activity records includes:

i) a third activity data; and ii) a fourth activity data;

train an entity-identifying machine learning model to identify a plurality of entity-identifying characteristics related to a plurality of known entities to obtain a trained entity-identifying machine learning model, based at least in part on:

i) a first portion of the third activity data; and ii) a second portion of the fourth activity data;

apply, when the predictive characteristic is present, the trained entity-identifying machine learning model to identify a known-entity data related to the completed activity of the user, based at least in part on:

i) the first activity data, ii) the second activity data and iii) the plurality of completed activity records related to the plurality of other users; and update the completed activity record of the completed
activity of the user based at least in part on:
i) the second activity data and
ii) the known entity data.
12. The system of clause 11, where the completed activity
of the user is a completed transaction of the user.
13. The system of clause 11, where the activity descrip-
tion includes a name of a merchant or a name of an entity
associated with the merchant.
14. The system of clause 11, where the rejection claim is
a false fraud claim.
15. The system of clause 11, where the predictive char-
acteristic is a characteristic of false fraud.
16. The system of clause 11, where the third activity data
includes historical transaction data entries.
17. The system of clause 11, where the fourth activity data
includes real time transaction data entries;
18. The system of clause 11, where the computer device
is also configured to transmit the request for the second
activity data to an application executed on a mobile com-
puting device of the user.
19. The system of clause 11, where the second activity
data includes at least one of:
i) the activity position of the completed activity;
ii) at least one visual input associated with the completed
activity;
iii) a text description of the completed activity; or
iv) a categorization of the completed activity.
20. The system of clause 11, where the known-entity data
includes a name of a merchant.

Publications cited throughout this document are hereby
incorporated by reference in their entirety. While one or
more embodiments of the present disclosure have been
described, it is understood that these embodiments are
illustrative only, and not restrictive, and that many modifi-
cations may become apparent to those of ordinary skill in the
art, including that various embodiments of the inventive
methodologies, the illustrative systems and platforms, and
the illustrative devices described herein can be utilized in
any combination with each other. Further still, the various
steps may be carried out in any desired order (and any
desired steps may be added and/or any desired steps may be
eliminated).

The invention claimed is:
1. A method, comprising:
receiving, by a computing device a completed activity
record of a completed activity of a user;
extracting, by the computing device, a first activity data of
the completed activity from the completed activity
record;
detecting, by the computing device, that the first activity
data comprises a predictive characteristic indicative of
a potential rejection claim,
wherein the predictive characteristic is related to an
activity description or an activity position related to
the completed activity;
producing, by the computing device, a request for a
second activity data of the completed activity, in
response to calculating a transaction risk score and
determining that the transaction risk score indicates
elevated risk for a false fraud claim, based at least in
part on the first activity data;
instructing, by the computing device, an application
executed on a mobile computing device of the user to
display, via a graphical user interface element, the
request for the second activity data to the user;

receiving, by the computing device, the second activity
data from the mobile computing device of the user;
wherein the second activity data comprises:
at least one user-captured multimedia input, com-
prising an image, associated with the completed
activity, and
geolocation data associated with the completed
activity;
receiving, by the computing device, a plurality of com-
pleted activity records related to a plurality of other
users;
wherein the plurality of completed activity records
comprises:
a third activity data; and
a fourth activity data;
applying, by the computing device, when the predictive
characteristic is present, a trained entity-identifying
machine learning model to identify a known-entity data
related to the completed activity of the user, based at
least in part on:
the first activity data,
i) the second activity data and
the plurality of completed activity records related to the
plurality of other users;
automatically generating, by the computing device, in real
time, an authorization decision based at least in part on
the known-entity data;
transmitting, by the computing device, in real time, an
authorization or refusal instruction to a remote trans-
action-settlement engine to cause posting or declining
of a transaction associated with the completed activity;
and
updating, by the computing device, the completed activity
record of the completed activity of the user based at
least in part on:
the second activity data and
the known-entity data.
2. The method of claim 1, wherein the completed activity
of the user is a completed transaction of the user.
3. The method of claim 1, wherein the activity description
comprises a name of a merchant or a name of an entity
associated with the merchant.
4. The method of claim 1, wherein the potential rejection
claim is the false fraud claim.
5. The method of claim 1, wherein the predictive char-
acteristic is a characteristic of false fraud.
6. The method of claim 1, further comprising transmitting,
by the computing device, the request for the second activity
data to the application executed on the mobile computing
device of the user.
7. The method of claim 1, wherein the known-entity data
comprises a name of a merchant.
8. A system, comprising:
a computing device configured to execute software
instructions that cause the computing device to at least:
receive a completed activity record of a completed
activity of a user;
extract a first activity data of the completed activity
from the completed activity record;
detect that the first activity data comprises a predictive
characteristic indicative of a potential rejection
claim,
wherein the predictive characteristic is related to an
activity description or an activity position related
to the completed activity;
produce a request for a second activity data of the
completed activity, in response to calculating a transaction risk score and determining that the transaction risk score indicates elevated risk for a false fraud claim, based at least in part on the first activity data;

instruct an application executed on a mobile computing device of the user to display, via a graphical user interface element, the request for the second activity data to the user;

receive the second activity data from the mobile computing device of the user;

wherein the second activity data comprises:

at least one user-captured multimedia input, comprising an image, associated with the completed activity, and geolocation data associated with the completed activity;

receive a plurality of completed activity records related to a plurality of other users;

wherein the plurality of completed activity records comprises:

a third activity data; and a fourth activity data;

apply, when the predictive characteristic is present, a trained entity-identifying machine learning model to identify a known-entity data related to the completed activity of the user, based at least in part on:

the first activity data, the second activity data and the plurality of completed activity records related to the plurality of other users;

automatically generate, in real time, an authorization decision based at least in part on the known-entity data;

transmit, in real time, an authorization or refusal instruction to a remote transaction-settlement engine to cause posting or declining of a transaction associated with the completed activity; and update the completed activity record of the completed activity of the user based at least in part on:

the second activity data and the known-entity data.

9. The system of claim 8, wherein the completed activity of the user is a completed transaction of the user.

10. The system of claim 8, wherein the activity description comprises a name of a merchant or a name of an entity associated with the merchant.

11. The system of claim 8, wherein a rejection claim is the false fraud claim.

12. The system of claim 8, wherein the predictive characteristic is a characteristic of false fraud.

13. The system of claim 8, wherein the computing device is also configured to transmit the request for the second activity data to the application executed on the mobile computing device of the user.

14. The system of claim 8, wherein the known-entity data comprises a name of a merchant.

15. The method of claim 1, further comprising training, by the computing device, an entity-identifying machine learning model to identify a plurality of entity-identifying characteristics related to a plurality of known entities to obtain the trained entity-identifying machine learning model, based at least in part on:

a portion of the third activity data; and a portion of the fourth activity data.

16. The method of claim 15, further comprising predicting, by the computing device, the known-entity data from the trained entity-identifying machine learning model that is configured to:

analyze the image using an image identification engine to detect merchant-identifying visual features;

perform optical character recognition and text parsing via a parse engine to extract text features; and utilize crowdsourced data from the plurality of other users to cluster patterns and predict at least one of a merchant name, a merchant category, or a merchant location as the known-entity data.

17. The method of claim 1, wherein producing the request for the second activity data is triggered in response to determining that the transaction risk score exceeds a threshold.

18. The method of claim 1, wherein the at least one user-captured multimedia input comprises a video or a sequence of images associated with the completed activity.

19. The system of claim 8, wherein the computing device is further configured to train an entity-identifying machine learning model to identify a plurality of entity-identifying characteristics related to a plurality of known entities to obtain the trained entity-identifying machine learning model, based at least in part on:

a portion of the third activity data, and a portion of the fourth activity data.

20. The system of claim 8, wherein the computing device is further configured to predict the known-entity data from the trained entity-identifying machine learning model that is configured to:

analyze the image using an image identification engine to detect merchant-identifying visual features;

perform optical character recognition and text parsing via a parse engine to extract text features; and utilize crowdsourced data from the plurality of other users to cluster patterns and predict at least one of a merchant name, a merchant category, or a merchant location as the known-entity data.

21. The system of claim 8, wherein the computing device is configured to produce the request for the second activity data is triggered in response to determining that the transaction risk score exceeds a threshold.

22. The system of claim 8, wherein the at least one user-captured multimedia input comprises a video or a sequence of images associated with the completed activity.

\* \* \* \* \*